Dec. 13, 1960 W. F. EGBERT ET AL 2,963,857
TURBOJET ENGINE
Filed Dec. 12, 1958 3 Sheets-Sheet 1

INVENTORS
William F. Egbert, &
BY Victor W. Peterson
Paul Fitzpatrick
ATTORNEY

United States Patent Office 2,963,857
Patented Dec. 13, 1960

2,963,857

TURBOJET ENGINE

William F. Egbert, Brownsburg, and Victor W. Peterson, Indianapolis, Ind., assignors to General Motors Corporation, Detroit, Mich., a corporation of Delaware Filed Dec. 12, 1958, Ser. No. 780,157

8 Claims. (Cl. 60—35.6)

Our invention relates to gas turbine jet propulsion engines and the like and more particularly to improved fuel supply and bearing cooling systems.

The invention is more particularly applicable to engines including a reheat burner in which fuel is burned in the exhaust duct of the engine downstream of the turbine. In its preferred embodiment, the invention provides a support for the turbine shaft bearing, an arrangement for diffusing fuel into the exhaust duct, and means for cooling a turbine shaft bearing by the fuel used for reheat combustion.

The principal objects of the invention are to provide an improved light weight turbine bearing support, to provide for cooling a turbine shaft bearing by fuel used for reheat combustion, and to provide improved means for supplying and diffusing the reheat fuel.

The nature of the invention and the advantages thereof will be clear to those skilled in the art from the succeeding detailed description of the preferred embodiment of the invention and the accompanying drawings.

Figure 1:
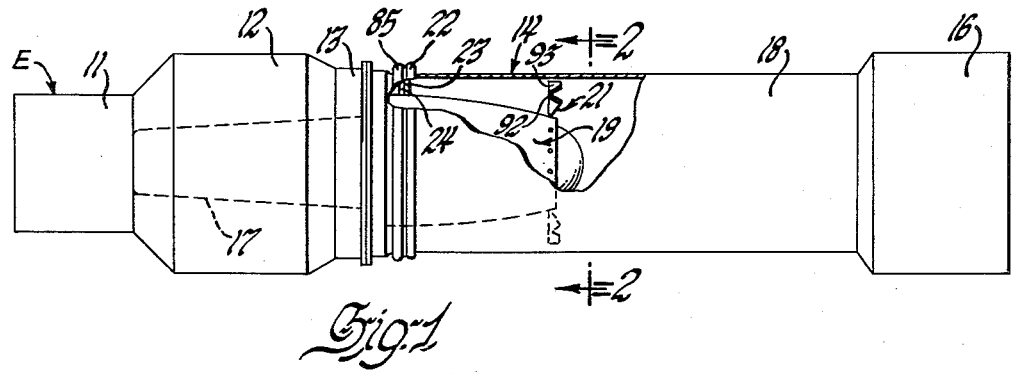
Figure 1 is a schematic drawing of a turbojet engine illustrating the environment of the invention.

Referring first to Figure 1, the turbojet engine E includes a compressor 11, a combustion section 12, a turbine section 13, an exhaust duct 14, and a jet nozzle 16 of any suitable type, preferably of variable area. The compressor is driven by the turbine through a large diameter hollow shaft 17 and supplies air under pressure to the combustion apparatus 12. The resulting combustion products flow through the turbine 13 and are exhausted from the turbine through the exhaust duct and variable jet nozzle 16. The exhaust duct is bounded by an outer wall 18 and, for a portion of its length, by an inner wall or tail cone 19. Flame holder 21 is mounted on the tail cone near its rear end. Fuel for reheat combustion is supplied through a manifold 22, flows radially inward through tubes 23, cools a bearing for the turbine, and is sprayed into the reheat combustion chamber defined by wall 18 from spray tubes 24.

The details of the engine in general and of the exhaust nozzle are not illustrated, since these may follow known practice and the details thereof are immaterial to an understanding of the invention.

Figure 3:
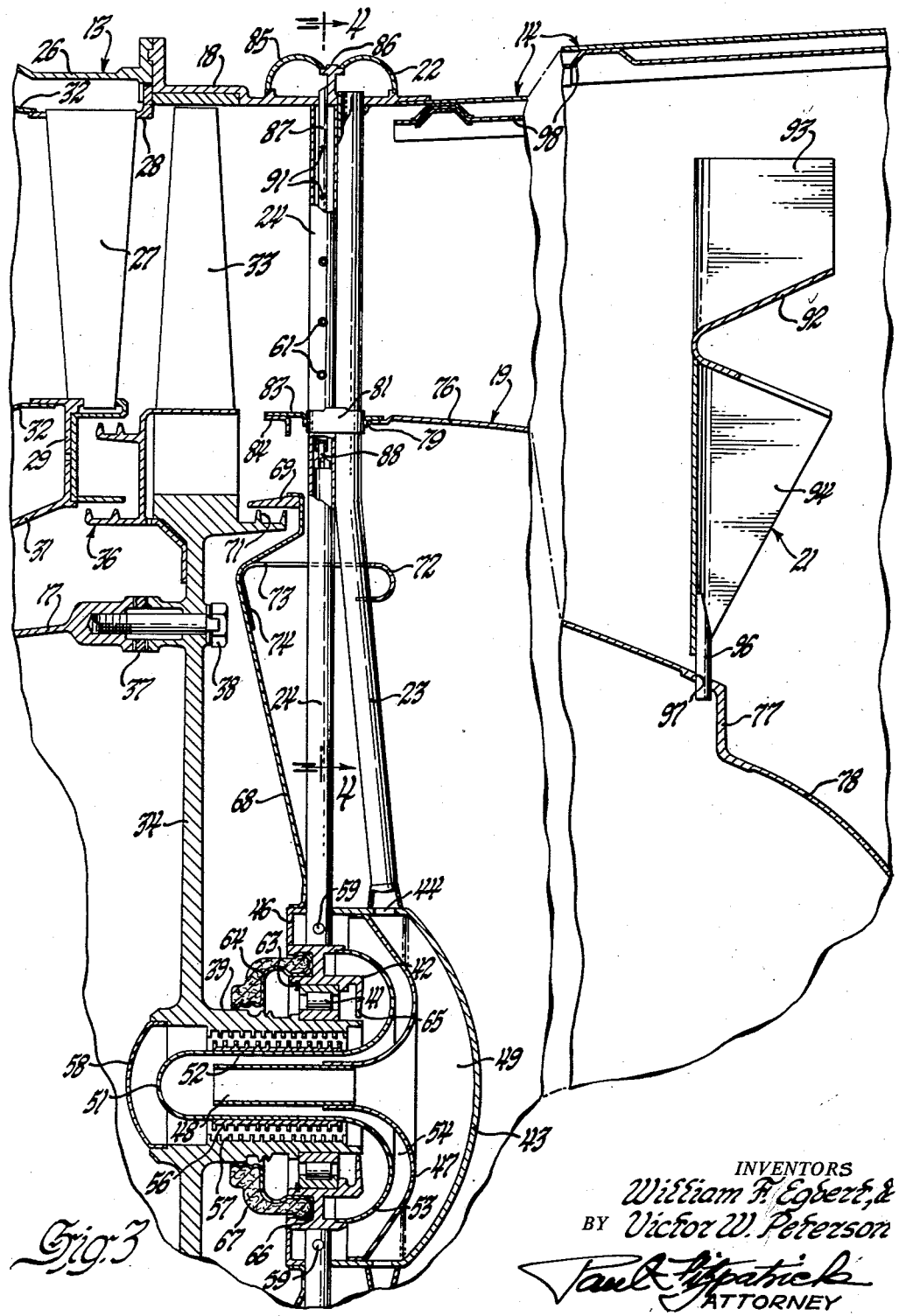
Figure 3 is a partial sectional view of the engine taken on a plane containing the axis thereof.

Referring to Figure 3, which illustrates the turbine and the bearing supporting and cooling and reheat fuel spraying structure of the invention, it will be seen that the turbine 13 comprises a case 26 having a flange which is bolted or otherwise secured to the outer exhaust duct wall 18. The turbine includes nozzles vanes 27 mounted in an outer shroud 28, mounted in the case, and in an inner shroud 29 mounted on a support 31 which is part of the fixed structure of the engine. The inner combustion chambers or flame tubes, the rear ends of which are shown at 32, discharge through the turbine nozzle onto blades 33 mounted on a turbine wheel 34. A labyrinth seal arrangement 36 is provided between the stationary and rotating parts. The shaft 17 is splined at 37 to the turbine wheel 34 and fixed to it by bolts 38. The turbine wheel includes a hollow hub or stub shaft 39 rotatably supported by a roller bearing 41 mounted in a cage or support ring 42. Suitable bearing means (not illustrated) at the compressor provide a second support for the compressor, turbine, and shaft 17.

The bearing cage 42 is supported from the exhaust duct wall 18 by a light weight structure consisting of a large number of radiating tubes; preferably there are fifteen tubes 23 and fifteen tubes 24. Tubes 23 are welded to the wall 18 and extend through wall 19 to a cup-shaped body or housing 43 defining a fuel chamber adjacent to the bearing 41. Each tube 23 discharges into body 43 through an opening 44. The forward end portion 46 of cup 43 has an inwardly directed flange which is welded to the forward edge of the cage 42. An annular plate 47 is welded to the interior of cup 43 and has fixed to it an outlet tube or spigot 48. As will be seen, the members 43 and 47 define a fuel chamber 49 supplied through tubes 23 and discharging through spigot 48. Fuel is fed to the tubes 23 from any suitable source of supply through the ring manifold 22 welded to the wall 18. A sheet metal cooling member or radiator 51 mounted within the shaft 39 and concentric with the spigot 48 includes a closed tubular or thimble portion 52 and a recurved flange 53, which is welded to the rear margin of the bearing cage 42. A fuel chamber or passage 54 is defined within the member 51 and the forward part of member 43 ahead of the diaphragm 47. Circumferential heat radiating ribs 56 are provided on the outer surface of thimble 52 and similar heat radiating ribs 57 are provided on the inner surface of shaft 39. A sheet metal cap 58 pressed into shaft 39 closes the front end of the shaft.

There are fifteen discharge tubes 24 which extend through the cup 43 and are welded or brazed to both the main body 43 and the forward part 46 thereof, which are brazed together. Tubes 24 are also united to bearing cage 42 by brazing or the like. These discharge tubes are in tandem with supply tubes 23 and the outer portions of the two tubes are in contact, as will be apparent from the drawings. Radial apertures 59 in tubes 24 allow fuel to flow from the chamber 54 into the discharge tubes, through which it flows radially through the inner wall 19. The outer ends of tubes 24 are closed by the outer wall 18 to which they are welded or brazed. A number of fuel discharge orifices 61 are provided in each discharge tube 24 to spray fuel therefrom into the exhaust duct.

Before further description of the fuel spray bars, some further discussion of the structure adjacent to bearing 41 is in order. To begin with, it may be noted that bearing 41 is lubricated by grease with which it is packed. This has the advantage of eliminating the pressure oil spray system usually provided for turbine bearings. However, in view of the intense heat on the outside of tail cone 19, it is necessary to cool the grease to prevent it from being boiled away by heat radiated from tail cone 19. It is also important to carry away heat generated by the rotation of the bearing itself. It will be seen that the cooling chambers 49 and 54 extend entirely around the inner and outer margins of the bearing and cover its rear face to shield it from radiated heat. The circulation of fluid through the chambers also carries away heat from the grease with which the bearing is packed.

The split between the flange 46 and the body 53 is in the plane of tubes 44 so that these may be brazed or welded directly to the bearing cage 42. Bearing 41 is retained in the cage by a snap ring 63. The shaft may be slipped into the bearing on assembly of the engine. The forward end of bearing 41 is enclosed by a metal shield ring 64 which provides a labyrinth seal with the stub shaft 39. The grease is contained in the space between seal ring 64 and a flange 65 on the bearing cage. Ring 64 may snap into place in a recess 66 in the forward face of the bearing cage 42. Radiation of heat from the turbine wheel 34 to the bearing is minimized by an insulating cover 67 on the seal ring 64. An annular heat shield or diaphragm 68 extends from the outer surface of portion 46 of the bearing support and bears at its outer margin a seal ring 69 cooperating with labyrinth seal ridges 71 on the rear face of the turbine wheel. This seal arrangement minimizes flow of hot exhaust gases into the space ahead of and around bearing 41. The outer part of diaphragm 68 is supported by brackets 72 which are of a generally U shape when viewed radially of the engine, having a slot 73 in the forward part of each bracket. The rear part of each bracket embraces and is welded or brazed to the tube 23 and the forward flange portions 74 are welded or brazed to the diaphragm 68.

The tail cone 19 also is supported by the tubes 23 and 24 acting as struts. The tail cone comprises a tapered forward section 76, a forged ring 77, and a rear dome 78, which are welded together. Slots are provided at 79 in the forward edge of potiron 76 to straddle the tubes 23 and 24. A clip 81 is brazed to each side of the assembly of tubes 23 and 24. The two clips provide a ring around the tubes. This ring is slidable in a flanged grommet 83 brazed over the slot in the tail cone portion 76. A stiffening ring 84 is welded to the front of the tail cone.

It will be seen that, in general, all of the fixed parts of the bearing support, the cooling chamber structure, the fuel spray and discharge pipes which act as struts, the tail cone, and the wall 18 are welded or brazed together to provide a rigid unitary structure of light weight.

Proceeding now to the fuel spraying structure; as previously pointed out, fuel under pressure flows outwardly through tubes 24. Air under pressure is supplied through a manifold 85. Manifolds 22 and 85 are brazed or welded to the wall 18, a flange 86 on the wall separating the two manifolds. The flange 86 and manifolds 22 and 85 stiffen and reinforce the wall 18 at the plane of attachment of struts 23, 24, and aid in carrying the load of the engine rotor and tail cone. The large number of very small struts provides good distribution of the load.

A small diameter tube 87 extends from manifold 85 through wall 18 and concentrically through tube 24 to a point within the tail cone. The outer end of each tube 87 is open, and the inner end is closed by a brazed plug 88 provided with flutes 89 which align it with the tube 24 and permit fuel to flow outwardly past the tube 87. A small air discharge 91 is provided in the air tube 87 in alignment with each fuel discharge orifice 61. As illustrated, there are two rows of five each of holes 91 and 61, the holes being in two sets 180° apart around the tubes and disposed to discharge the fuel at right angles to the direction of gas flow. Any other orientation of the holes with respect to the axis of the engine may be employed. The compressed air is under higher pressure than the fuel, which, in turn, is under higher pressure than the combustion products in the exhaust duct. The blast of air flowing through the orifice 61 aids in atomization of the fuel to insure proper combustion.

Figure 2:
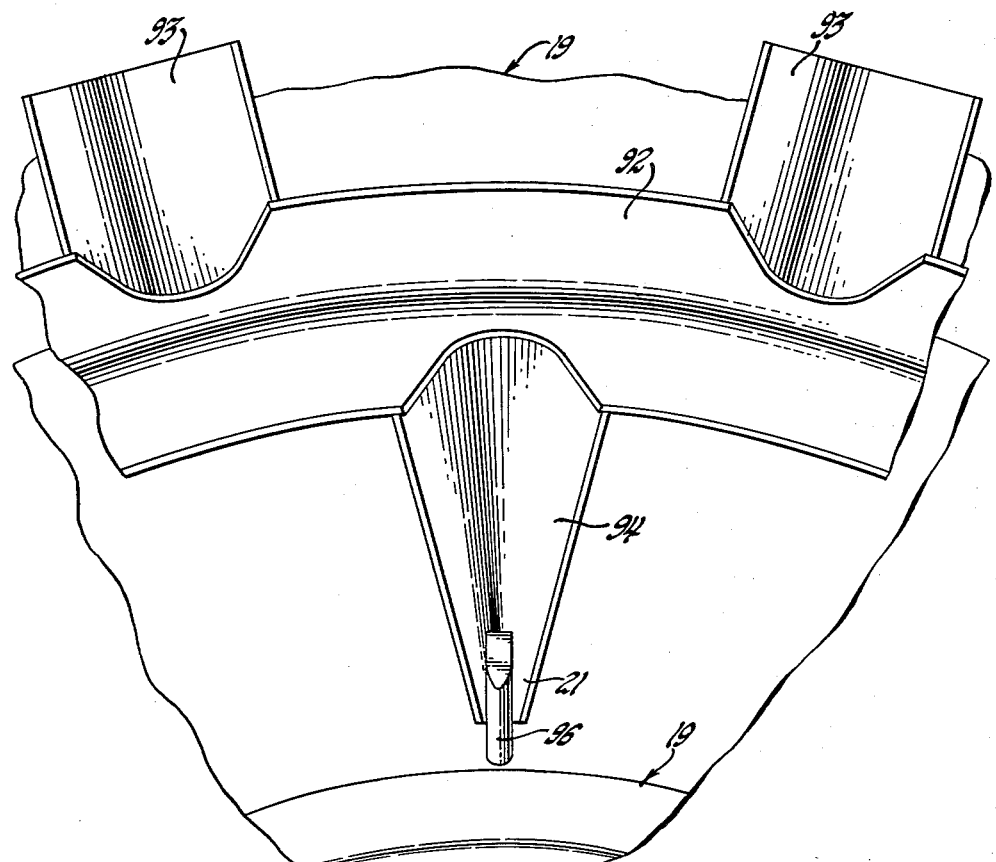
Figure 2 is a partial transverse sectional view of the engine, taken on the plane indicated by the line 2—2 in Figure 1, illustrating the flame holder.

The flame holder 21 (Figures 2 and 3) comprises a continuous V-section gutter ring 92. Troughs or gutters 93 extend radially outwardly from the ring 92 and tapered troughs or gutters 94 extend inwardly from ring 92 intermediate the gutters 93. This structure is supported with freedom for expansion on the ring 77 portion of the tail cone by rods 96 welded to the gutters 94 and slidable in holes 97 in the ring portion 77. The flame holder, aided by the step in the tail cone at 77, provides a sheltered zone to anchor the flame and sets up turbulence to assist the flame propagation, as is well known. The wall 18 is provided with a liner 98.

Suitable ignition means (not illustrated) may be provided.

Figure 4:
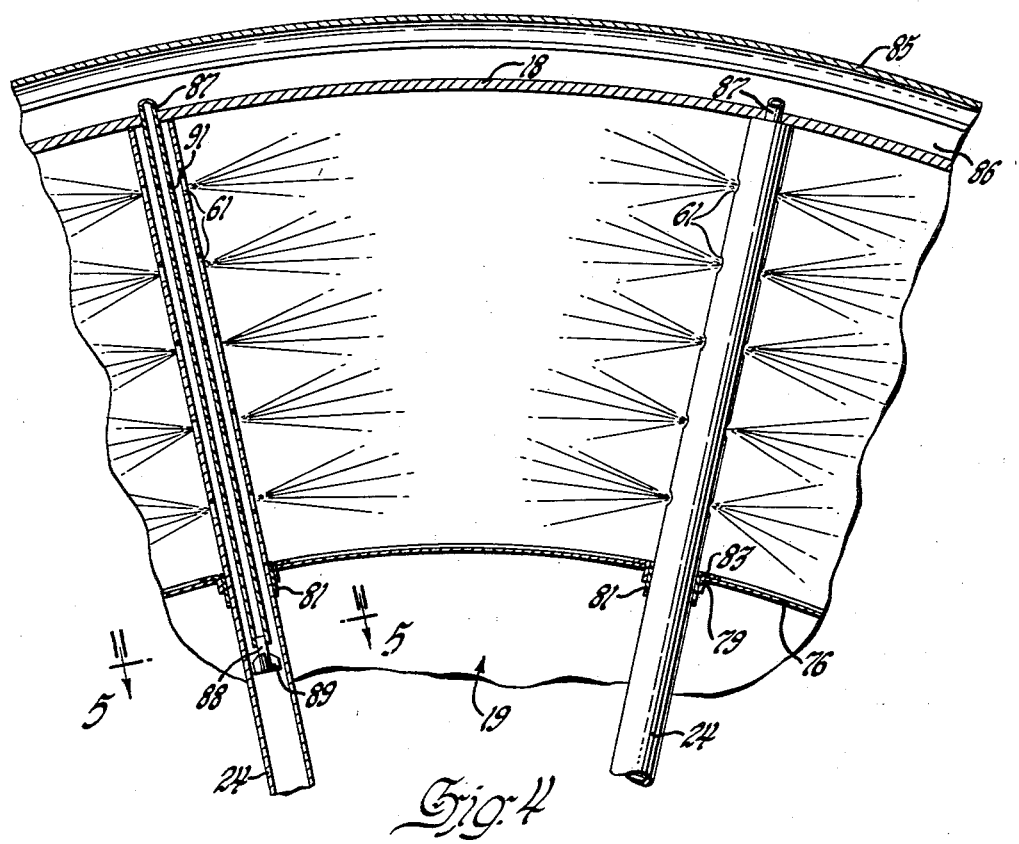
Figure 4 is a transverse sectional view taken substantially on the plane indicated by the line 4—4 in Figure 3, with parts cut away.
Figure 5:
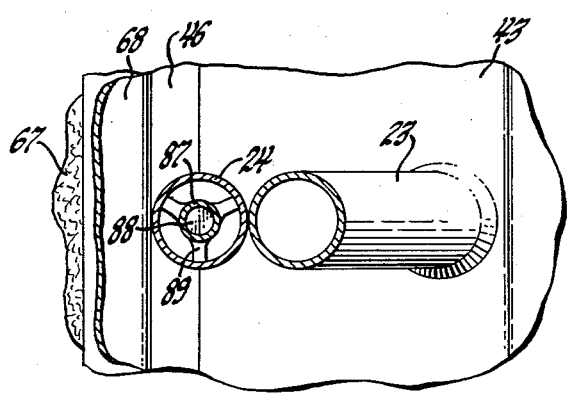
Figure 5 is a detail sectional view taken on a plane indicated by the line 5—5 in Figure 4.

It will be appreciated that the structure described is particularly suited for an engine in which reheat burning is the normal mode of operation of the engine so that fuel is continuously circulated through the tubular struts 23 and 24. However, similar bearing supporting and coling structure could be used by providing suitable means to continue a circulation of cooling fluid around the bearing. For example, if no afterburner is provided, tubes 24 could discharge into manifold 85 by opening up an outlet from each tube into the manifold. Because of the large number of struts and the cooling of the struts by the liquid circulating through them, they may be of very small size. As will be apparent from Figure 4, the preferred ararngement of the tubes provides very little interference to gas flow. The tubes also provide a large number of well distributed outlets for the reheat fuel. The fuel and air manifolds serve not only to supply fuel and air, but also as significant structural members reinforcing the exhaust duct wall at the plane where the load is carried by it. The cooling arrangement provides very adequate cooling and shielding of the bearing from heat radiating from the hot parts of the engine so that the bearing may be packed with grease instead of employing a continuous supply of lubrication to carry the heat away from the bearing. The structure is of very light weight and readily fabricated.

Since the mode of operation of jet engines, including those with reheat burners, is well known, there is no need to enlarge upon it.

The description of the preferred embodiment of the invention for the purpose of explaining the principles thereof is not to be considered as limiting the invention, since many modifications may be made by the exercise of skill in the art without departing from the invention.

We claim:

1. A jet engine comprising, in combination, a turbine, an exhaust duct for the turbine terminating in a jet nozzle, the exhaust duct having an outer wall and having an inner wall adjacent the turbine, the turbine including a rotor shaft and a bearing within the inner wall supporting the shaft, and means for cooling and supporting the bearing comprising a fuel manifold on the outer wall, a plurality of fuel supply tubes extending radially from the manifold through the inner wall, a first fuel chamber connected to the supply tubes disposed adjacent to and supporting the bearing and having an outlet spigot extending into the shaft within the bearing, a second fuel chamber extending into the shaft around the spigot and extending around the rear face and periphery of the bearing, and a plurality of fuel discharge tubes extending radially from the second chamber to the outer wall, each discharge tube being disposed in tandem with a supply tube.

2. A jet engine comprising, in combination, a turbine, an exhaust duct for the turbine terminating in a jet nozzle, the exhaust duct having an outer wall and having an inner wall adjacent the turbine, the turbine including a rotor shaft and a bearing within the inner wall supporting the shaft, and means for diffusing fuel into the exhaust duct and cooling and supporting the bearing comprising a fuel manifold on the outer wall, a plurality of fuel supply tubes extending radially from the manifold through the inner wall, a first fuel chamber connected to the supply tubes disposed adjacent to and supporting the bearing and having an outlet spigot extending into the shaft within the bearing, a second fuel chamber extending into the shaft around the spigot and extending around the rear face and periphery of the bearing, a plurality of fuel discharge tubes extending radially from the second chamber into the exhaust duct, and fuel spray means in the exhaust duct supplied through the discharge tubes.

3. A jet engine comprising, in combination, a turbine, an exhaust duct for the turbine terminating in a jet nozzle, the exhaust duct having an outer wall and having an inner wall adjacent the turbine, the turbine including a rotor shaft and a bearing within the inner wall supporting the shaft, and means for diffusing fuel into the exhaust duct and cooling the bearing comprising a fuel manifold on the outer wall, a plurality of fuel supply tubes extending radially from the manifold through the inner wall, a first fuel chamber means connected to the supply tubes disposed adjacent the bearing and having an outlet spigot extending into the shaft within the bearing, a second fuel chamber means extending into the shaft around the spigot and extending around the rear face and periphery of the bearing, and a plurality of fuel discharge tubes extending radially from the second chamber into the exhaust duct, each discharge tube being disposed in tandem with a supply tube, and the discharge tubes having orifices therein within the exhaust duct for discharge of the fuel for combustion in the exhaust duct.

4. A jet engine comprising, in combination, a turbine, an exhaust duct for the turbine terminating in a jet nozzle, the exhaust duct having an outer wall and having an inner wall adjacent the turbine, the turbine including a rotor shaft and a bearing within the inner wall supporting the shaft, and means for diffusing fuel into the exhaust duct and cooling the bearing comprising a fuel manifold fixed on the outer wall, a plurality of fuel supply tubes extending radially from the manifold through the inner wall, a first fuel chamber means connected to the supply tubes disposed adjacent the bearing and having an outlet spigot extending into the shaft within the bearing, a second fuel chamber means extending into the shaft around the spigot and extending around the rear face and periphery of the bearing, a plurality of fuel discharge tubes extending radially from the second chamber into the exhaust duct, each discharge tube being disposed in tandem with a supply tube, the discharge tubes having orifices therein within the exhaust duct for discharge of the fuel for combustion in the exhaust duct; a compressed air manifold fixed on the outer wall, and air tubes extending from the air manifold into the discharge tubes, the air tubes having air outlets aligned with the said orifices.

5. A jet engine comprising, in combination, a turbine, an exhaust duct for the turbine terminating in a jet nozzle, the exhaust duct having an outer wall and having an inner wall adjacent the turbine, the turbine including a rotor shaft and a grease-packed bearing within the inner wall supporting the shaft, and means for diffusing fuel into the exhaust duct, supporting the inner wall and the bearing, and cooling the bearing comprising a fuel manifold on the outer wall, a plurality of fuel supply tubes extending radially from the manifold through the inner wall, a first fuel chamber means connected to the supply tubes disposed adjacent the bearing and having an outlet spigot extending into the shaft within the bearing, a second fuel chamber means extending into the shaft around the spigot and extending around the rear face and periphery of the bearing, a plurality of fuel discharge tubes extending radially from the second chamber into the exhaust duct, the fuel chamber means being supported by the tubes and supporting the bearing, each discharge tube being disposed in tandem with a supply tube, the discharge tubes having orifices therein within the exhaust duct for discharge of the fuel for combustion in the exhaust duct; a compressed air manifold on the outer wall, and air tubes extending from the air manifold into the discharge tubes, the air tubes having air outlets aligned with the said orifices.

6. A jet engine comprising, in combination, a turbine, an exhaust duct for the turbine terminating in a jet nozzle, the exhaust duct having an outer wall and having an inner wall adjacent the turbine, the turbine including a rotor shaft and a bearing within the inner wall supporting the shaft, and means for cooling and supporting the bearing comprising a fuel manifold on the outer wall fixed thereto and stiffening the wall, a plurality greater than ten of circumferentially spaced liquid supply tubes extending radially from the manifold through the inner wall and a plurality of liquid discharge tubes extending radially from the outer wall through the inner wall in tandem with the supply tubes, the supply and discharge tubes being fixed to the outer wall adjacent the manifold, a bearing support mounting the turbine shaft bearing, and a cooling chamber structure encircling and shielding the bearing, the supply and discharge tubes being connected to and supporting the bearing support and chamber structure and being connected to the chamber structure for circulation of liquid therethrough, the discharge tubes communicating with outlet means for the fuel.

7. A jet engine comprising, in combination, a turbine, an exhaust duct for the turbine terminating in a jet nozzle, the exhaust duct having an outer wall and having an inner wall adjacent the turbine, the turbine including a rotor shaft and a bearing within the inner wall supporting the shaft, and means for cooling and supporting the bearing comprising a fuel manifold on the outer wall fixed thereto and stiffening the wall, a plurality of circumferentially spaced fuel supply tubes extending radially from the manifold through the inner wall and a plurality of fuel discharge tubes extending radially from the outer wall through the inner wall in tandem with the supply tubes, the supply and discharge tubes being fixed to the outer wall adjacent the manifold, a bearing support mounting the turbine shaft bearing, and a cooling chamber structure encircling and shielding the bearing, the supply and discharge tubes being connected to and supporting the bearing support and chamber structure and being connected to the chamber structure for circulation of fuel therethrough, the discharge tubes communicating with outlet means for the fuel.

8. A jet engine comprising, in combination, a turbine, an exhaust duct for the turbine terminating in a jet nozzle, the exhaust duct having an outer wall and having an inner wall adjacent the turbine, the turbine including a hollow rotor shaft and a bearing within the inner wall supporting the shaft, and means for cooling and supporting the bearing comprising a fuel manifold on the outer wall fixed thereto and stiffening the wall, a plurality of circumferentially spaced fuel supply tubes extending radially from the manifold through the inner wall and a plurality of fuel discharge tubes extending radially from the outer wall through the inner wall in tandem with the supply tubes, the supply and discharge tubes being fixed to the outer wall adjacent the manifold, a bearing support mounting the turbine shaft bearing, and a cooling chamber structure encircling and shielding the bearing and extending into the rotor shaft, the supply and discharge tubes being connected to and supporting the bearing support and chamber structure and being connected to the chamber structure for circulation of fuel therethrough, the discharge tubes communicating with outlet means for the fuel in the exhaust duct.

References Cited in the file of this patent

UNITED STATES PATENTS 2,479,776   Price _____ Aug. 23, 1949

UNITED STATES PATENT OFFICE
CERTIFICATION OF CORRECTION

Patent No. 2,963,857                          December 13, 1960

William F. Egbert et al.

It is hereby certified that error appears in the above numbered patent requiring correction and that the said Letters Patent should read as corrected below.

Column 2, line 1, for "nozzles" read -- nozzle --; column 3, line 33, for "potiron" read -- portion --; line 60, after "discharge" insert -- hole --; column 4, line 24, for "ararngement" read -- arrangement --.

Signed and sealed this 27th day of June 1961.

(SEAL)
Attest:

ERNEST W. SWIDER
Attesting Officer

DAVID L. LADD
Commissioner of Patents